(12) United States Patent
Rouleau et al.

(10) Patent No.: US 10,906,578 B2
(45) Date of Patent: Feb. 2, 2021

(54) POWER ACTUATOR ASSEMBLY FOR STEERING COLUMN ASSEMBLIES

(71) Applicant: STEERING SOLUTIONS IP HOLDING CORPORATION, Saginaw, MI (US)

(72) Inventors: James E. Rouleau, Burt, MI (US); Scott A. Stinebring, Auburn, MI (US); Harmony J. Hudnall, Mt. Morris, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 355 days.

(21) Appl. No.: 15/858,442

(22) Filed: Dec. 29, 2017

(65) Prior Publication Data
US 2019/0202495 A1 Jul. 4, 2019

(51) Int. Cl.
*B62D 5/04* (2006.01)
*B62D 1/181* (2006.01)

(52) U.S. Cl.
CPC .......... *B62D 5/0445* (2013.01); *B62D 1/181* (2013.01); *B62D 5/0403* (2013.01); *B62D 5/0409* (2013.01); *B62D 5/0454* (2013.01); *B60Y 2410/102* (2013.01)

(58) Field of Classification Search
CPC ........ B62D 5/445; B62D 5/454; B62D 5/403; B62D 5/409
See application file for complete search history.

(56) References Cited

U.S. PATENT DOCUMENTS

| | | | |
|---|---|---|---|
| 3,915,517 A | 10/1975 | Orefice | |
| 3,922,935 A * | 12/1975 | Dahlem | B25B 15/06 81/480 |
| 4,114,221 A * | 9/1978 | Enchelmaier | A46B 3/18 15/182 |
| 4,728,088 A | 3/1988 | Smith | |
| 4,834,202 A * | 5/1989 | Shimizu | B62D 5/0406 180/444 |
| 7,173,196 B2* | 2/2007 | Gruson | G01G 13/2851 141/83 |
| 8,104,567 B2* | 1/2012 | Murakami | B62D 5/0403 180/443 |
| 9,102,349 B2* | 8/2015 | Sandholzer | B60R 25/02107 |
| 9,341,266 B1* | 5/2016 | Vivatson | F16J 10/02 |
| 9,962,149 B2* | 5/2018 | Brown | A61B 17/04 |
| 10,000,227 B2* | 6/2018 | Kurokawa | B62D 5/0409 |

(Continued)

*Primary Examiner* — Joseph M Rocca
*Assistant Examiner* — Conan D Duda
(74) *Attorney, Agent, or Firm* — Dickinson Wright PLLC

(57) ABSTRACT

A power actuator assembly for a steering column assembly is provided. The power actuator assembly include an electric motor. Also included is a leadscrew. Further included is a gear arrangement operatively coupled to the electric motor, the gear arrangement driving rotation of the leadscrew. Yet further included is a nut threaded to the leadscrew, rotation of the leadscrew actuating linear motion of the nut relative to the leadscrew, the nut operatively coupled to a moveable portion of the steering column assembly to actuate motion of the moveable portion. Also included is a leadscrew housing, the leadscrew extending axially through the leadscrew housing. Further included is a helical bushing disposed between a radially inner surface of the leadscrew housing and a radially outer surface of the leadscrew.

17 Claims, 7 Drawing Sheets

(56) References Cited

U.S. PATENT DOCUMENTS

| | | | |
|---|---|---|---|
| 10,220,876 B2* | 3/2019 | Krieger | F16C 27/066 |
| 10,305,344 B2* | 5/2019 | Fujisaki | H02K 7/083 |
| 2009/0199667 A1* | 8/2009 | Menjak | H02K 7/06 |
| | | | 74/424.7 |
| 2014/0020973 A1* | 1/2014 | Galehr | B62D 5/0409 |
| | | | 180/444 |
| 2015/0040699 A1* | 2/2015 | Hafermalz | B62D 3/02 |
| | | | 74/89.16 |
| 2015/0217797 A1* | 8/2015 | Sin | B62D 5/0403 |
| | | | 180/444 |
| 2016/0167700 A1* | 6/2016 | Fujita | B62D 5/0418 |
| | | | 180/444 |
| 2016/0368528 A1* | 12/2016 | Shiina | B62D 5/0415 |
| 2016/0368529 A1* | 12/2016 | Shiina | F16D 13/00 |

* cited by examiner

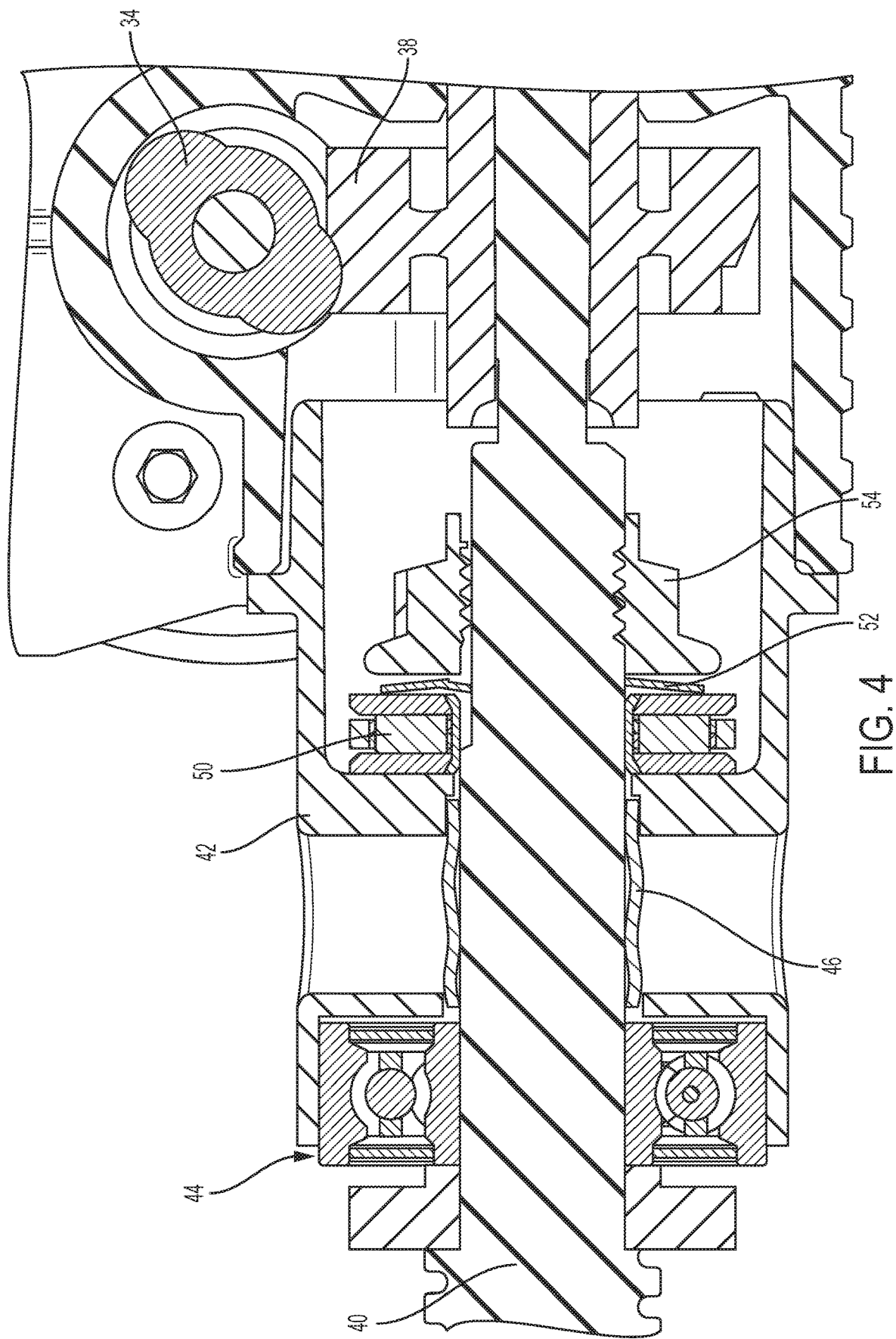

US 10,906,578 B2

POWER ACTUATOR ASSEMBLY FOR STEERING COLUMN ASSEMBLIES

FIELD OF INVENTION

The embodiments disclosed herein relate to vehicle steering column assemblies and, more particularly, to a power actuator assembly for such steering columns.

BACKGROUND OF INVENTION

Adjustable steering columns include one or more actuators to facilitate rake and/or telescoping adjustment of the steering column. Power column actuators emit noise attributes when actuating the rake and telescope systems. Some actuator systems are designed to provide a stiff and lash free system, but limit the ability to make sound quality improvements. For example, some designs incorporate a series of thrust bearings to support a leadscrew assembly. The thrust bearings are efficient at supporting axial loads, but are over-constrained when there is any leadscrew rotational runout or misalignment between the column's actuator mounting features and the actuator attachment locations relative to the moveable portion of the steering column.

SUMMARY OF INVENTION

According to an aspect of the disclosure, a power actuator assembly for a steering column assembly is provided. The power actuator assembly include an electric motor. Also included is a leadscrew. Further included is a gear arrangement operatively coupled to the electric motor, the gear arrangement driving rotation of the leadscrew. Yet further included is a nut threaded to the leadscrew, rotation of the leadscrew actuating linear motion of the nut relative to the leadscrew, the nut operatively coupled to a moveable portion of the steering column assembly to actuate motion of the moveable portion. Also included is a leadscrew housing, the leadscrew extending axially through the leadscrew housing. Further included is a helical bushing disposed between a radially inner surface of the leadscrew housing and a radially outer surface of the leadscrew.

According to another aspect of the disclosure, a power actuator assembly includes a leadscrew rotatable about a leadscrew axis, rotation of the leadscrew operatively driven by an electric motor to actuate linear motion of a nut threaded to the leadscrew. Also included is a leadscrew housing, the leadscrew extending axially through the leadscrew housing. Further included is a bushing disposed between a radially inner surface of the leadscrew housing and a radially outer surface of the leadscrew, the bushing having one or more radially exterior features and one or more radially interior features to form a non-cylindrical bushing. Yet further included is a ball bearing set having an inner race in contact with the leadscrew and an outer race in contact with a leadscrew housing.

These and other advantages and features will become more apparent from the following description taken in conjunction with the drawings.

BRIEF DESCRIPTION OF EACH FIGURE OF DRAWING

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

FIG. 4 is a side, cross-sectional view of a bearing assembly of the power actuator assembly;

DETAILED DESCRIPTION OF EMBODIMENTS OF INVENTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
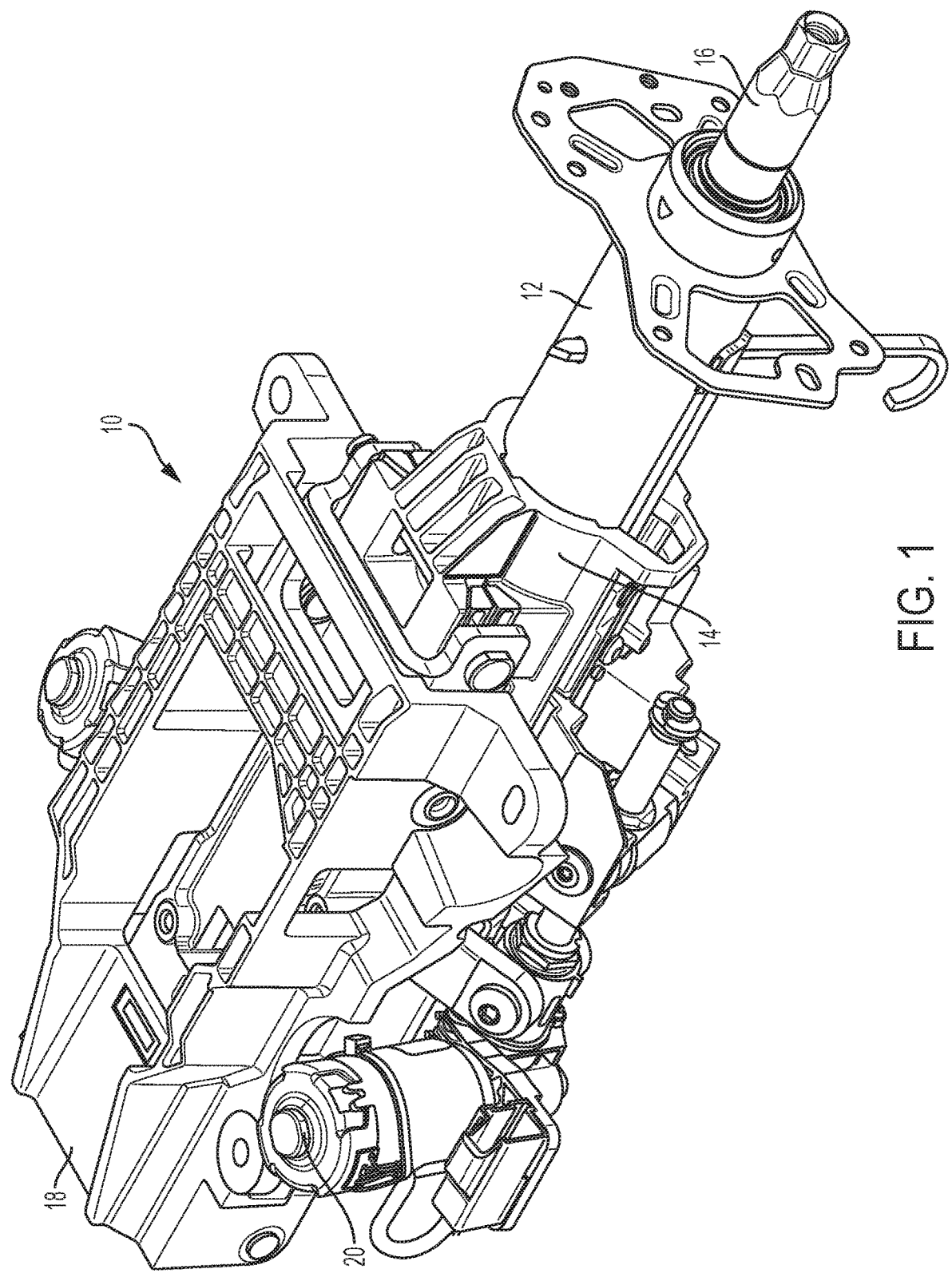
FIG. 1 is a perspective view of a steering column assembly.

Referring now to FIG. 1, a steering column assembly is shown and referenced generally with numeral 10. The steering column assembly 10 includes an upper jacket 12 that is in a telescoping relationship with a lower jacket 14. The upper jacket 12 is a moveable portion of the assembly 10 and the lower jacket 14 is a stationary portion of the assembly 10. One or more steering shafts 16 are surrounded by the upper jacket 12 and the lower jacket 14. A mounting bracket 18 is operatively coupled to the lower jacket 14 and facilitates mounting of the steering column assembly 10 to a vehicle.

The steering column assembly 10 is a power adjustable assembly that electromechanically adjusts the position of the steering column assembly 10. In the illustrated embodiment, an actuator, such as an electric motor 20, controls a telescoping adjustment of the steering column assembly and may be referred to as a telescope actuator 20. The telescope actuator 20 takes rotary motion from an electric motor and translates it into linear motion via a gear mechanization and a bearing, leadscrew, and nut assembly, which is collectively referred to as a power actuator assembly, as described in detail herein.

Figure 2:
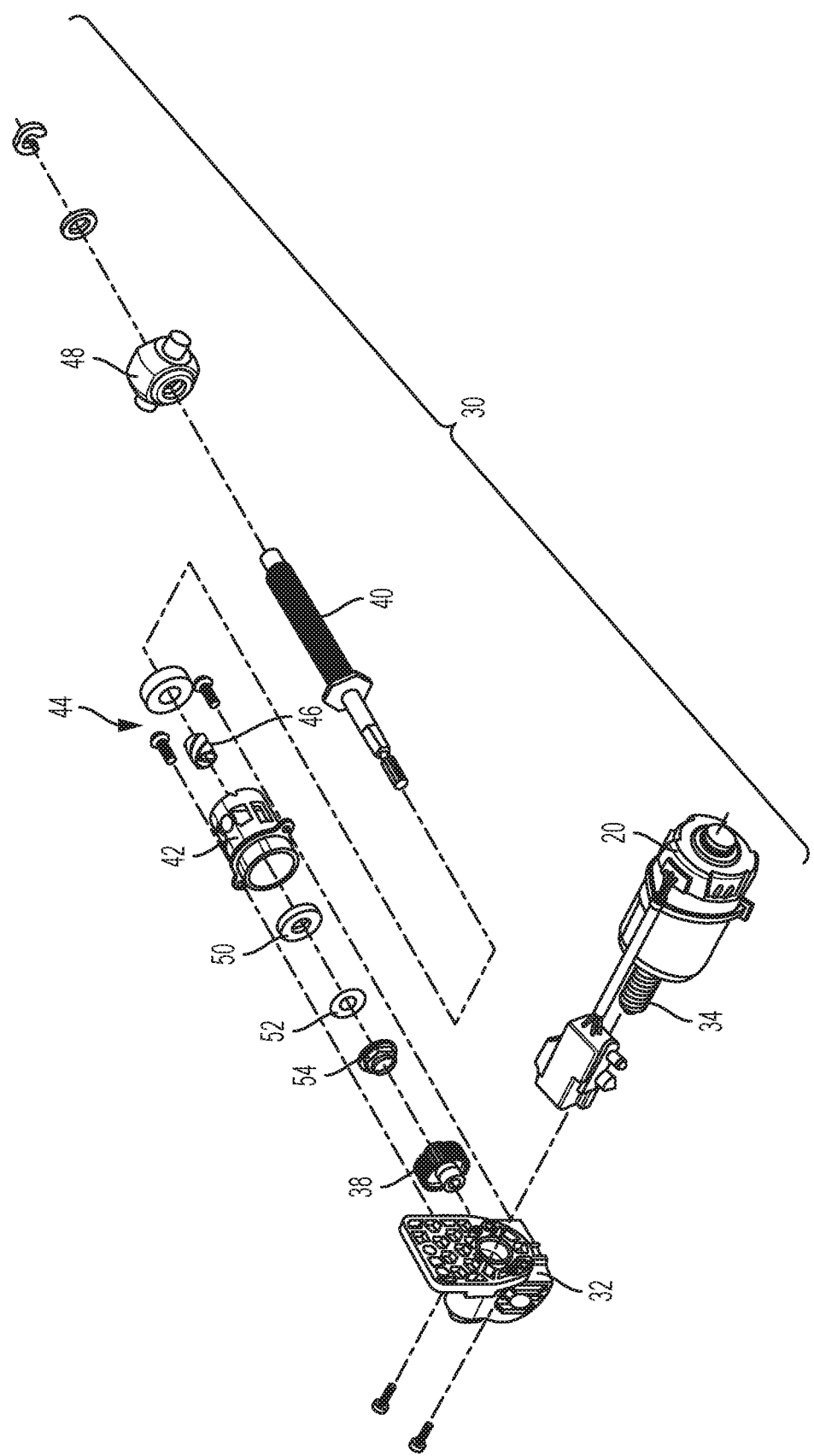
FIG. 2 is a disassembled view of a power actuator assembly for the steering column assembly.
Figure 3:
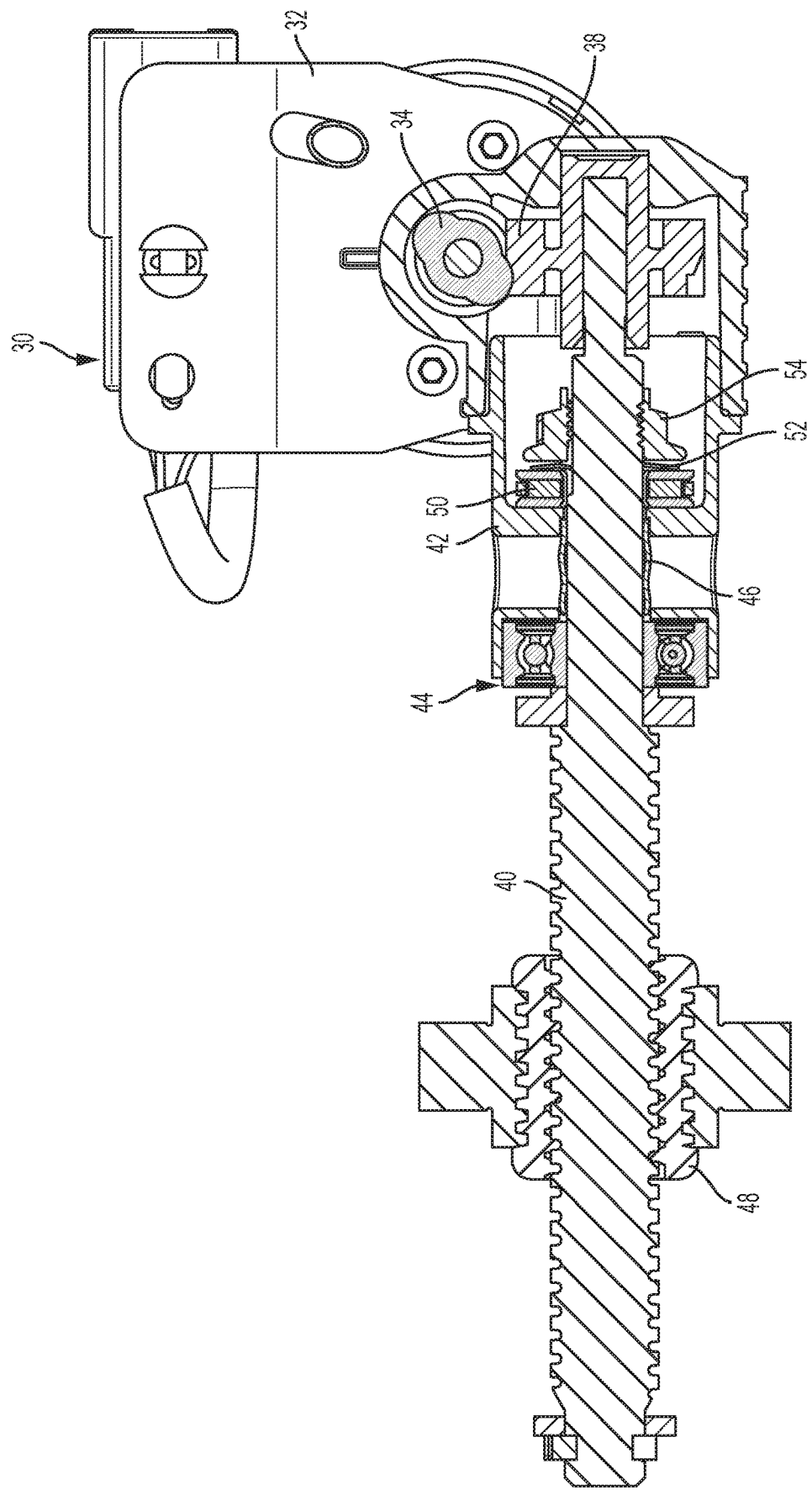
FIG. 3 is a side, cross-sectional view of the power actuator assembly.

Referring now to FIGS. 2 and 3, the power actuator assembly is illustrated and referenced generally with numeral 30. The power actuator assembly includes numerous components that facilitate adjustment of the steering column assembly 10, while utilizing an economical bearing system that is axially stiff, has no axial low load lash, supports axial energy absorption loads, and has radial compliance to allow leadscrew eccentricity and actuator mounting feature misalignments. Additionally, the power actuator assembly 30 avoids inducing unwanted binding and undesirable noise characteristics.

The power actuator assembly 30 includes the electric motor 20 that is attached to an actuator housing 32 (FIG. 3). When power is supplied to the electric motor 20, a worm 34 that is fixed to an output shaft of the electric motor 20 rotates about an axis of the output shaft. The worm 34 interfaces with a worm gear 38 and transmits rotation and torque from the worm 34 to the worm gear 38. The worm gear 38 is attached to one end of a leadscrew 40. Rotation of the worm gear 38 imparts rotation of the leadscrew 40.

The leadscrew 40 is supported by a leadscrew housing 42. A ball bearing assembly 44, a bushing 46 and other components allow the leadscrew 40 to rotate within the fixed leadscrew housing 42. The leadscrew housing 42 is operatively coupled to a stationary portion of the steering column assembly 10, such as the lower jacket 14 and/or the mounting bracket 18. Coupling the leadscrew housing 42 secures the power actuator assembly 30 to the steering column assembly 10. The leadscrew housing 42 is also operatively coupled to, and locates relative to, the actuator housing 32.

A trunnion nut 48 is threaded to the leadscrew 40. The trunnion nut 48 is operatively coupled to the upper jacket 12, such that rotation of the lead screw 40 translates the trunnion nut 48 and the upper jacket 12 therealong to achieve linear motion of the upper jacket 12 relative to the lower jacket 14. The linear motion effects desired rake/tilt and telescoping movements. Other components included in the power actuator assembly 30 include a thrust bearing 50, a spring washer 52, and a retaining nut 54.

Referring to FIG. 4, a portion of the power actuator assembly 30 is illustrated in more detail. In particular, the leadscrew housing 42 and components housed therein, are shown in more detail. The leadscrew 40 extends through the leadscrew housing 42 and is radially retained therein with the ball bearing assembly 44 and the bushing 46.

Referring to FIGS. 4-7, the bushing 46 is a helical bushing, in contrast to a cylindrical bushing. The bushing 46 is a low cost, low friction plastic molded component in some embodiment. The bushing includes a series of helical ribs, the geometry of the ribs being such that the overall geometry results in a tight fit the outside diameter of the rotating leadscrew 40, as well as a tight fit to the internal bore axis of the leadscrew housing 42. The helical ribs are configured to provide interior helical features 80 and exterior helical features 82. The geometry of the bushing 46 is also such that it can adjust to the actual size of the mating components due to the clearance present on the opposite side of the contact surfaces of the helical bushing 46. Furthermore, the helical fashion of the ribs results in a full 360 degree contact area with the mating components. This assists in maintaining a concentric leadscrew rotation about the center of the axis of the leadscrew housing 42. It also allows for a slight misalignment of the leadscrew 40 and the leadscrew housing axis when needed due to misalignment of the actuator mating column interface components without inducing unwanted binding. Additionally, the helical bushing 46 allows the threads of the leadscrew 40 that interface with the trunnion nut 48 to rotate in an eccentric motion without binding when needed due to leadscrew runout that is generated in the low cost manufacturing process of rolling the leadscrew threads. Systems that bind have shown to degrade noise quality during actuation.

Figure 6:
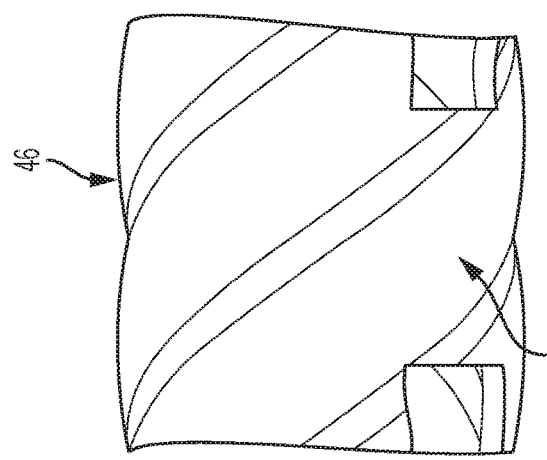
FIG. 6 is an elevational, side view of the helical bushing.
Figure 7:
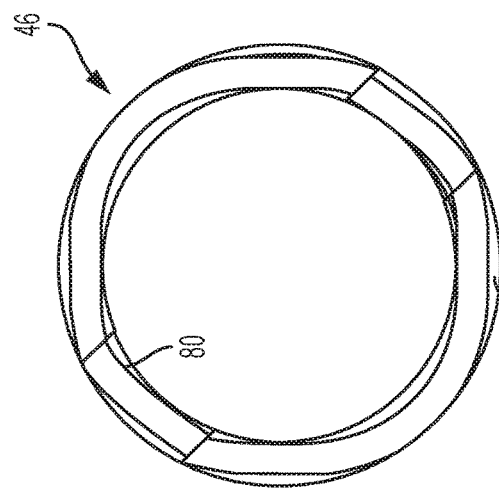
FIG. 7 is an end view of the helical bushing.
Figure 5:
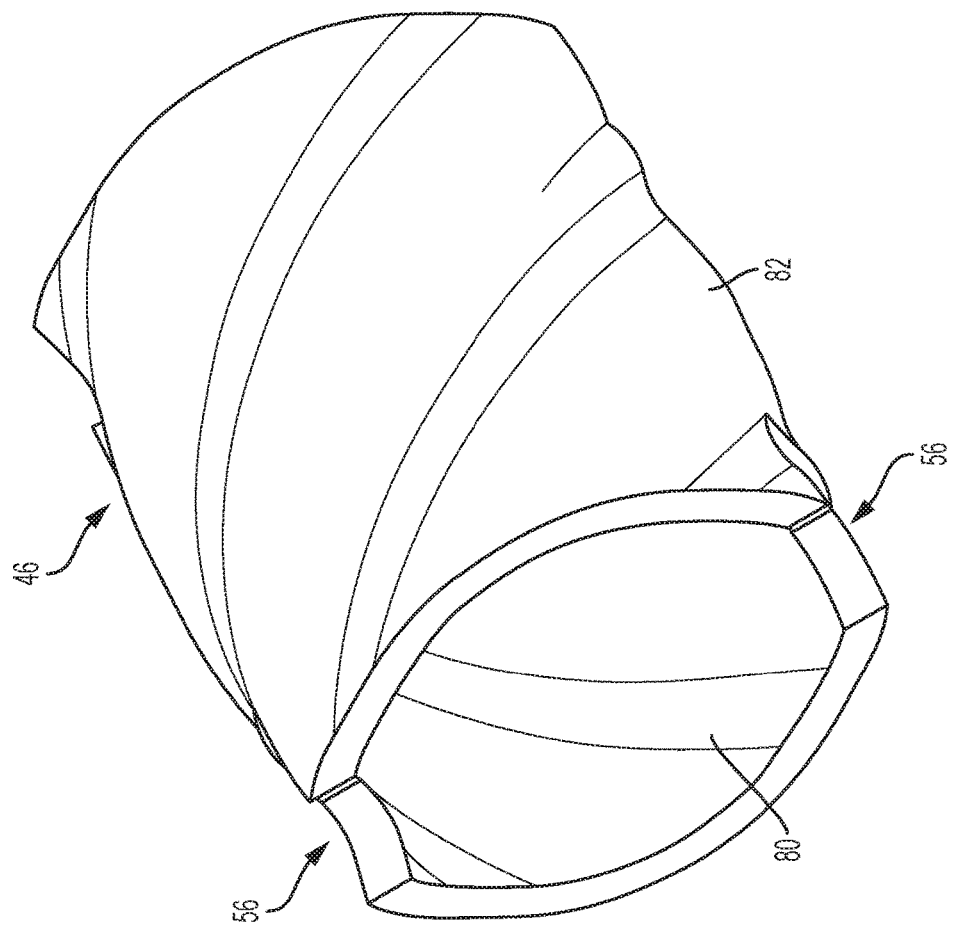
FIG. 5 is a perspective view of a helical bushing of the bearing assembly.

In the illustrated embodiment of FIGS. 5-7, the bushing 46 includes at least one notch 56 defined at one or both axial ends of the bushing 46, however, embodiments without such a notch is contemplated. In embodiments having one or more notches 56, the notch(s) serve as a key for locating the bushing 46 during installation within the leadscrew housing 42.

Figure 8:
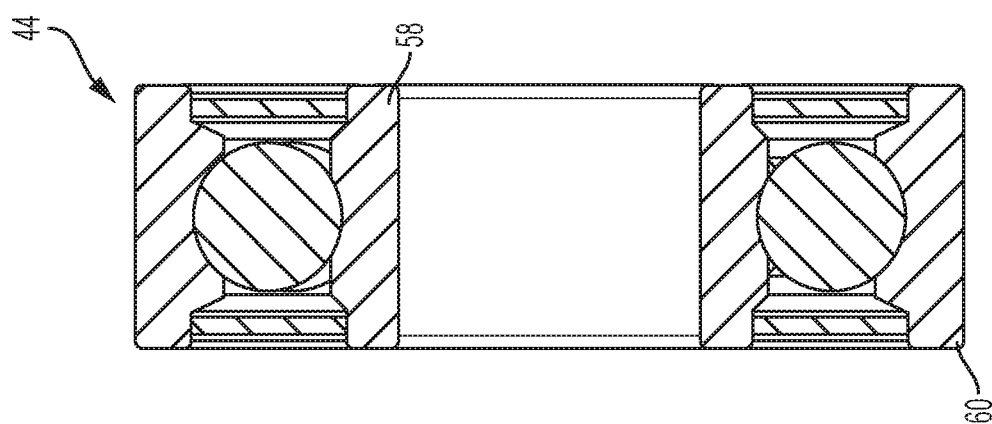
FIG. 8 is an elevational view of a ball bearing set of the bearing assembly.

As shown in FIGS. 4 and 8, the ball bearing assembly 44 includes one or more ball bearing sets that radially constrain the leadscrew 40. An inner race 58 of the ball bearing assembly 44 is in contact with the leadscrew 40 and an outer race 60 is in contact with the leadscrew housing 42. The inner race axis centerline can pivot relative to the outer race axis centerline due to a designed internal bearing clearance. This also reduces binding when the leadscrew 40 contains runout or when actuator mounting points are misaligned. By forcing opposing contact points to the mating components, and with the load provided by the spring washer 52, the bearing will self-delash and act as a thrust bearing.

Figure 9:
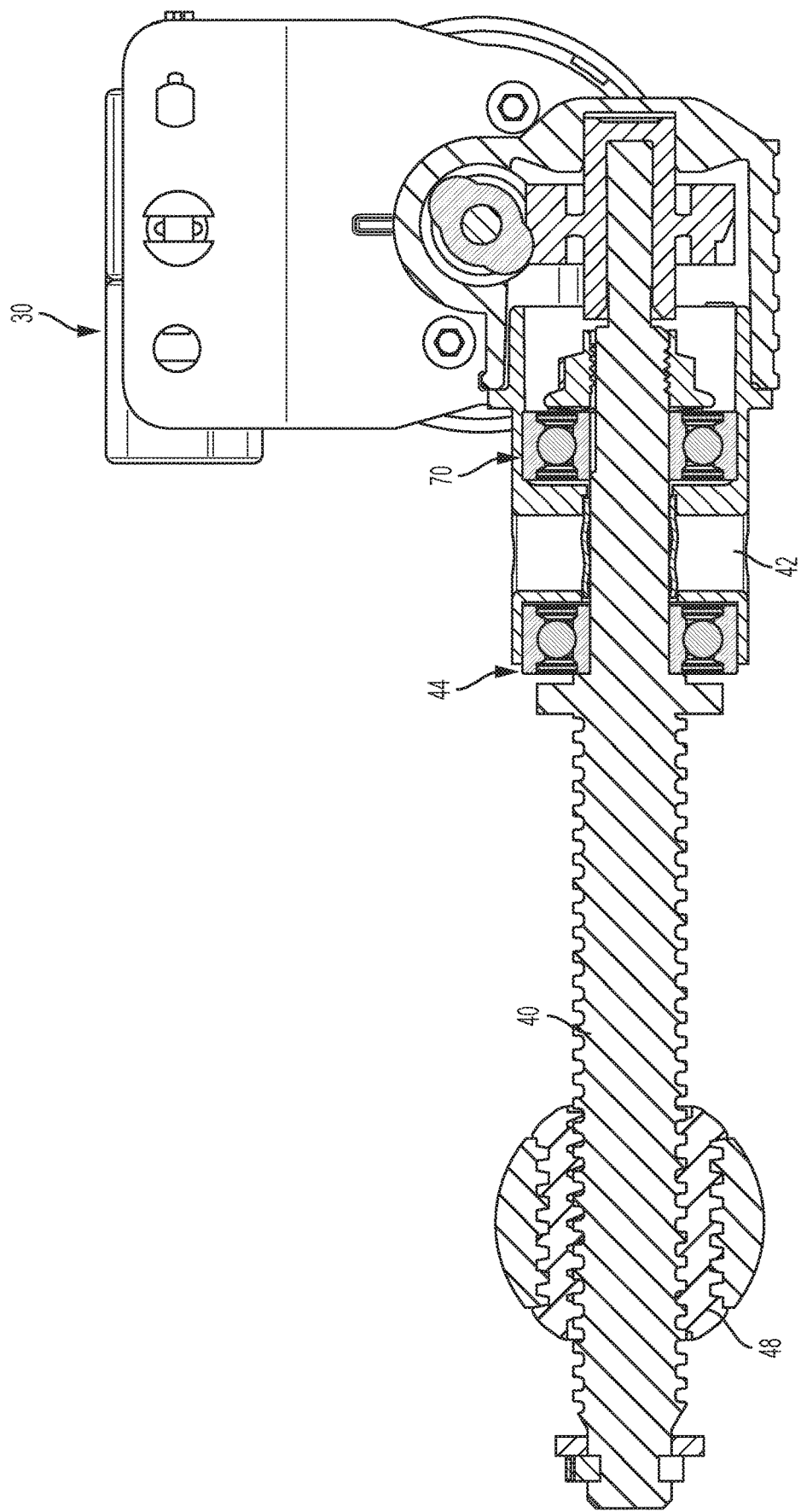
FIG. 9 is a side, cross-sectional view of the power actuator assembly according to another aspect of the disclosure.

Referring now to FIG. 9, the power actuator assembly 30 is illustrated according to another aspect of the disclosure. In particular, ball bearing assemblies are provided in two locations. Specifically, ball bearing assembly 44 is disposed in the location described above in conjunction with the embodiments of FIGS. 1-8. A second ball bearing assembly 70 is provided in place of the thrust bearing 50 of the previously described embodiments.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. A power actuator assembly for a steering column assembly, the power actuator assembly comprising:
    an electric motor;
    a leadscrew;
    a gear arrangement operatively coupled to the electric motor, the gear arrangement driving rotation of the leadscrew;
    a nut threaded to the leadscrew, rotation of the leadscrew actuating linear motion of the nut relative to the leadscrew, the nut operatively coupled to a moveable portion of the steering column assembly to actuate motion of the moveable portion;
    a leadscrew housing, the leadscrew extending axially through the leadscrew housing; and
    a helical bushing disposed between a radially inner surface of the leadscrew housing and a radially outer surface of the leadscrew.

2. The power actuator assembly of claim 1, further comprising a ball bearing set radially constraining the lead screw.

3. The power actuator assembly of claim 2, wherein the ball bearing set is a first ball bearing set located at a first axial location of the leadscrew and within the leadscrew housing, the power actuator assembly further comprising a second ball bearing set located at a second axial location of the leadscrew and within the leadscrew housing.

4. The power actuator assembly of claim 3, wherein the first ball bearing set and the second ball bearing set each include an inner race in contact with the leadscrew and an outer race in contact with the leadscrew housing.

5. The power actuator assembly of claim 2, wherein the ball bearing set is a first ball bearing set located at a first axial location of the leadscrew and within the leadscrew housing, the power actuator assembly further comprising an axial thrust bearing disposed at a second axial location of the leadscrew and within the leadscrew housing.

6. The power actuator assembly of claim 5, wherein the axial thrust bearing is disposed between a leadscrew housing flange and a retaining nut.

7. The power actuator assembly of claim 1, wherein the helical bushing comprises a plurality of ribs defining a radially interior helical pattern and a radially outer helical pattern.

8. The power actuator assembly of claim 1, wherein the bushing is flexible.

9. The power actuator assembly of claim 7, wherein the helical bushing comprises a first axial end and a second axial end, at least one of the ends defining at least one notch for locating the helical bushing relative to another component.

10. The power actuator assembly of claim 9, wherein each axial end defines at least one notch.

11. The power actuator assembly of claim 1, wherein the gear arrangement is a worm gear arrangement.

12. A power actuator assembly comprising:
a leadscrew rotatable about a leadscrew axis, rotation of the leadscrew operatively driven by an electric motor to actuate linear motion of a nut threaded to the leadscrew;
a leadscrew housing, the leadscrew extending axially through the leadscrew housing;
a bushing disposed between a radially inner surface of the leadscrew housing and a radially outer surface of the leadscrew, the bushing having one or more radially exterior features and one or more radially interior features to form a non-cylindrical bushing; and
a ball bearing set having an inner race in contact with the leadscrew and an outer race in contact with a leadscrew housing.

13. The power actuator assembly of claim 12, wherein the ball bearing set is a first ball bearing set located at a first axial location of the leadscrew and within the leadscrew housing, the power actuator assembly further comprising a second ball bearing set located at a second axial location of the leadscrew and within the leadscrew housing.

14. The power actuator assembly of claim 13, wherein the first ball bearing set and the second ball bearing set each include an inner race in contact with the leadscrew and an outer race in contact with the leadscrew housing.

15. The power actuator assembly of claim 12, wherein the ball bearing set is a first ball bearing set located at a first axial location of the leadscrew and within the leadscrew housing, the power actuator assembly further comprising an axial thrust bearing disposed at a second axial location of the leadscrew and within the leadscrew housing.

16. The power actuator assembly of claim 15, wherein the axial thrust bearing is disposed between a leadscrew housing flange and a retaining nut.

17. The power actuator assembly of claim 12, wherein the bushing comprises a plurality of ribs defining a radially interior helical pattern and a radially outer helical pattern.

* * * * *